United States Patent [19]

Gilbu et al.

[11] 4,165,765
[45] Aug. 28, 1979

[54] GLASS FIBER REINFORCED THERMOSETTING RESIN PIPE WALL CONSTRUCTION

[75] Inventors: Agnar Gilbu, Sandefjord, Norway; Lee E. Pearson; Mark E. Greenwood, both of Conroe, Tex.

[73] Assignee: Owens-Corning Fiberglas Corporation, Toledo, Ohio

[21] Appl. No.: 872,126

[22] Filed: Jan. 25, 1978

Related U.S. Application Data

[63] Continuation of Ser. No. 697,282, Jun. 17, 1976, abandoned.

[51] Int. Cl.² ............................................. F16L 9/12
[52] U.S. Cl. ..................................... 138/174; 138/140; 138/137; 138/DIG. 2; 138/DIG. 7
[58] Field of Search ............... 138/132, 137, 140, 141, 138/145, 172, 174, 177, 178, DIG. 2, DIG. 7; 428/36, 377, 293

[56] References Cited

U.S. PATENT DOCUMENTS

| | | | |
|---|---|---|---|
| 2,614,058 | 10/1952 | Francis | 138/141 X |
| 2,773,287 | 12/1956 | Stout | 138/174 |
| 2,925,831 | 2/1960 | Welty et al. | 138/174 X |
| 3,226,273 | 12/1965 | Becker | 156/195 |
| 3,329,173 | 7/1967 | Skoggard et al. | 138/141 |
| 3,340,115 | 9/1967 | Rubenstein | 156/86 |
| 3,406,724 | 10/1968 | Carlstrom et al. | 138/141 X |
| 3,532,132 | 10/1970 | Rubenstein | 138/172 |
| 3,871,409 | 3/1975 | Gilbu | 138/174 |
| 3,884,269 | 5/1975 | Schetty et al. | 138/137 |
| 3,893,488 | 7/1975 | Rogers et al. | 138/141 |
| 3,953,629 | 4/1976 | Wesch | 138/141 X |

FOREIGN PATENT DOCUMENTS

| | | | |
|---|---|---|---|
| 2031959 | 1/1972 | Fed. Rep. of Germany | 138/DIG. 2 |
| 1097678 | 1/1968 | United Kingdom | 138/174 UX |

*Primary Examiner*—Richard E. Aegerter
*Assistant Examiner*—James E. Bryant, III
*Attorney, Agent, or Firm*—Ronald C. Hudgens; Paul J. Rose

[57] ABSTRACT

Various pipe wall constructions comprising thermosetting resin, randomly disposed chopped glass fibers, sand, circumferentially extending continuous glass filaments, and axially extending glass fibers in various percentages in structural wall portions thereof, and having various protective inner liner and outer wall portions.

51 Claims, 3 Drawing Figures

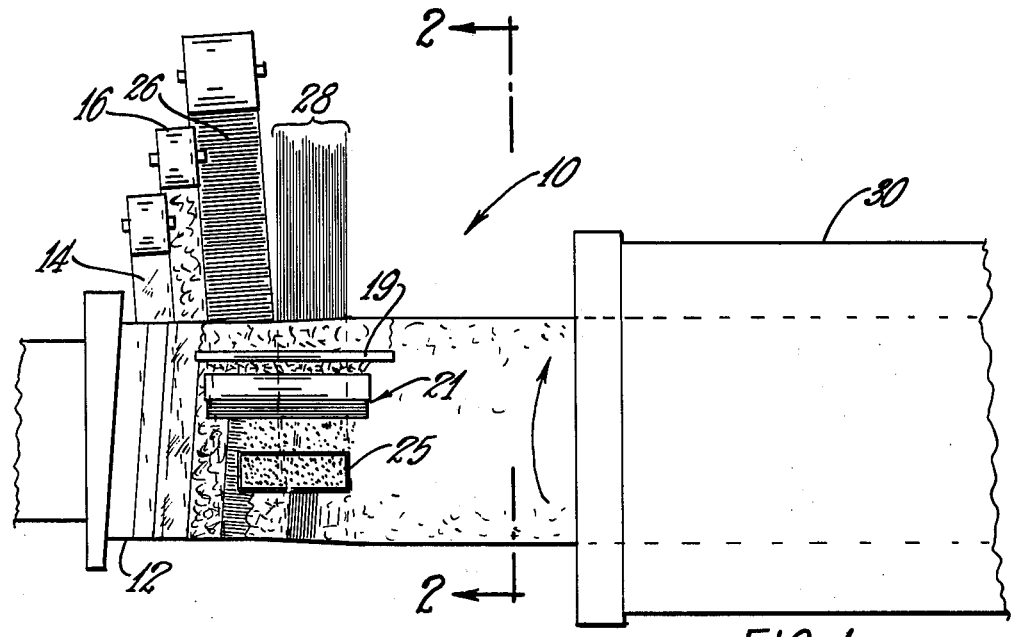
FIG. 1
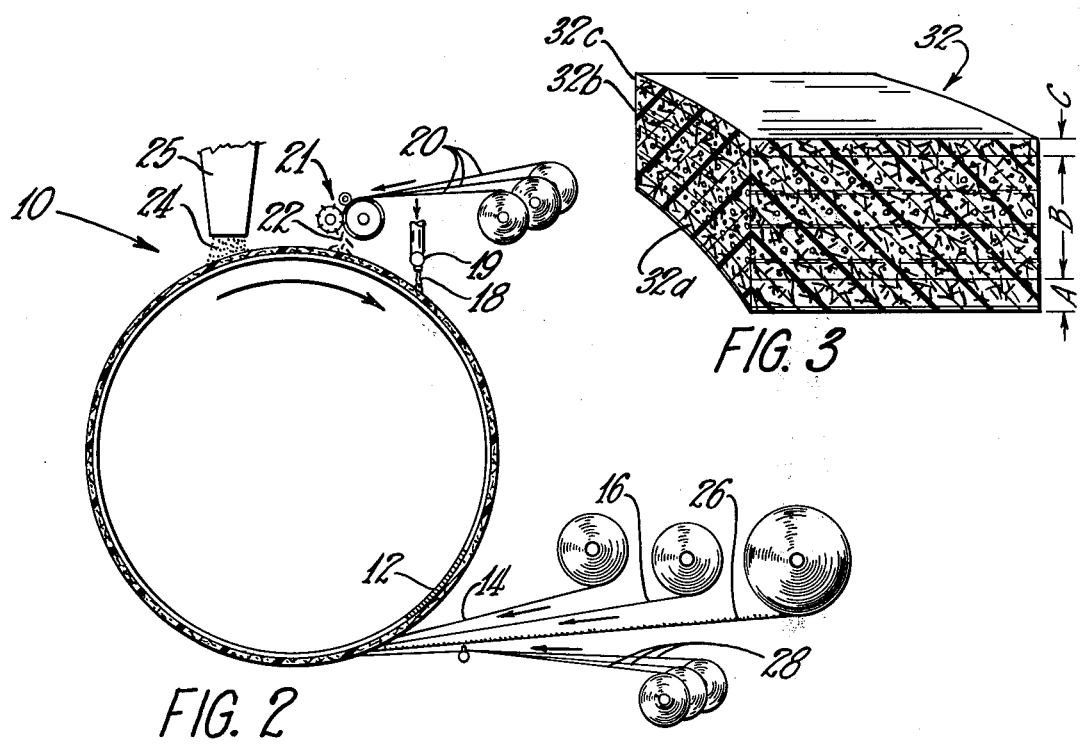
FIG. 2
FIG. 3

GLASS FIBER REINFORCED THERMOSETTING RESIN PIPE WALL CONSTRUCTION

This is a continuation of application Ser. No. 697,282, filed June 17, 1976 now abandoned.

This invention relates generally to reinforced plastic pipe, and more particularly to various compositions of structural wall, liner and outer wall portions thereof. The new constructions are improvements over the pipe structures disclosed in U.S. Pat. No. 3,871,409, issued Mar. 18, 1975. These prior pipe structures included structural walls having interior, central, and exterior portions with thicknesses of 20%, 60% and 20% respectively, of the total wall thickness and various percentages of resin, chopped glass fibers, sand, and continuously wound glass filaments in the different wall portions for different kinds of pipe. Corrosion resistance of the prior pipe was not as good as it might have been. Each of the wall portions had a resin content of from 30% to 40% by weight, and each of the wall portions included sand.

It has been found satisfactory to make the structural wall portion of a pipe substantially uniform, rather than in three concentric wall portions of different compositions. Further, it has been found advantageous to provide a resin-rich, sand-free liner, and in many cases to also provide a resin-rich, sand-free protective outer wall portion. The liner may be from 60% to 95% resin by weight and from 5% to 40% glass fiber reinforcement. An outer wall portion may be similarly composed.

Accordingly, an object of the invention is to provide improved pipe wall constructions with resin-rich, sand-free liner and exterior wall portions and structural wall portions comprising various percentages of thermosetting resin, chopped glass fibers, sand, continuously wound glass filaments, and axially oriented glass fibers.

Other objects and advantages will become apparent when the following specification is considered along with the accompanying drawings in which:

FIG. 1 is a schematic plan view of a machine for making reinforced plastic pipe constructed in accordance with the invention;

FIG. 2 is an enlarged sectional view taken generally along the line 2—2 of FIG. 1; and FIG. 3 is a schematic perspective sectional view representative of a pipe wall constructed in accordance with the invention.

With respect to the drawings, a machine 10 for making glass fiber reinforced thermosetting resin pipe is shown in FIGS. 1 and 2. The machine 10 includes a rotatable mandrel 12 of the helically circulating endless steel band type such as shown in U.S. Pat. Nos. 3,464,879; 3,655,489; and 3,679,521. First applied to the mandrel 12 from below is a parting strip 14 of thin plastic film for preventing later applied resin from sticking to the mandrel. In most instances, a surface mat 16 is next applied. The mat 16 is a thin, non-woven glass fiber mat preferably made of corrosion resistant C glass as disclosed in U.S. Pat. No. 2,308,857. Thermosetting polyester resin 18 is applied from above through a pipe-like dispenser 19, glass fiber strands 20 are fed to a chopper 21 to supply chopped glass fibers 22, and sand 24 is applied from a hopper 25. The chopped glass fibers 22 are preferably made from E glass as disclosed in U.S. Pat. No. 2,334,931. Axially extending glass fiber reinforcing material 26 and circumferentially extending continuously wound glass filament reinforcing material 28 also made of E glass are applied from below. The mandrel 12 extends through an oven 30 in which the thermosetting resin is cured.

For each revolution of the mandrel 12, the pipe being formed advances longitudinally an amount substantially equal to the width of the helical band forming the mandrel surface. When bands of relatively narrow width are used, each longitudinal segment of the pipe may pass under the resin dispenser 19 as many as twenty times before advancing past the entire length thereof. For relatively thicker pipe walls, additional resin dispensers 19, choppers 21, and sand hoppers 25, and supplies of axially extending glass fibers 26 and continuously wound glass filaments 28 may be provided and spaced longitudinally of the mandrel 12. It would also be possible within the scope of the invention to form the pipe on a rotatable but axially stationary mandrel, using a carriage reciprocable axially of the mandrel and carrying dispensing means for resin, sand, and glass fibers.

FIG. 3 schematically shows a perspective sectional view of a pipe wall 32 constructed in accordance with the invention and including a liner portion 32a of a thickness A, a structural wall portion 32b of a thickness B, and an outer wall portion 32c of a thickness C.

In accordance with the invention, various pipe wall structures are provided each having a relatively thin liner portion 32a, a structural wall portion 32b, and a relatively thin outer wall portion 32c. The liner portion 32a on a particular pipe may be as little as 0.020 inches (0.508 mm) thick or as great as 0.150 inches (3.81 mm) thick, depending on intended usage of the pipe. In most instances, the liner portion includes a surface mat such as the mat 16 and randomly disposed chopped glass fibers such as fibers 22 in the resin, although in some pipe the surface mat is omitted and in other pipe the chopped glass fibers are omitted from the liner portion. No sand is included in the liner portion, which may be from 60% to 95% resin by weight and from 5% to 40% glass fiber reinforcement. Typically the liner is from 90% to 95% resin and from 5% to 10% glass when only surface mat is used and from 70% to 80% resin and from 20% to 30% glass when chopped glass fibers are included.

The outer wall portion 32c on a particular pipe may be as little as 0.010 inches (0.254 mm) thick or as great as 0.10 inches (2.54 mm) thick, depending on the intended environment of the pipe. In most instances, the outer wall portion includes randomly disposed chopped glass fibers and resin, but no surface mat, although in some pipe surface mat is also included along with the chopped glass fibers and in other pipe surface mat is substituted for chopped glass fibers in the outer wall portion. The outer wall portion may be from 60% to 95% resin by weight and from 5% to 40% glass fiber reinforcement. Typically the outer wall portion is from 90% to 95% resin and from 5% to 10% glass when including surface mat, but not chopped glass fibers, and from 70% to 80% resin and from 20% to 30% glass when chopped glass fibers are included.

The structural wall portion 32b has a thickness determined by the pipe diameter and the internal pressure the pipe is designed to withstand. For example, the thickness may be as little as 0.10 inches (2.54 mm) or as great as 3.0 inches (7.62 cm). In accordance with the invention, the structural wall portion includes from 30% to 60% resin by weight, from 0% to 45% sand, from 3% to 25% randomly disposed chopped glass fibers, from 0% to 60% continuously wound glass filaments, and from 0% to 25% axially extending glass fibers.

Pipes for use with little or no internal pressure may have a structural wall portion 32b comprising from 35% to 45% resin by weight, from 30% to 45% sand, from 10% to 20% randomly disposed chopped glass fibers, and from 3% to 7% circumferentially extending continuously wound glass filaments. A structural wall portion having substantially 40% resin, 40% sand, 15% chopped glass fibers, and 5% continuously wound glass filaments has proved satisfactory.

Pipes for use with low internal pressures may have a structural wall portion 32b comprising from 35% to 45% resin by weight, from 22% to 32% sand, from 13% to 23% continuously wound glass filaments, and from 12% to 18% chopped glass fibers. A structural wall portion having substantially 40% resin, 25% sand, 20% continuously wound glass filaments, and 15% chopped glass fibers has proved satisfactory. Another satisfactory structural wall portion for low pressure pipe comprises substantially 40% resin, 30% sand, 15% continuously wound glass filaments, and 15% chopped glass fibers.

When axial reinforcement is desired, the structural wall portion of low pressure pipe may comprise from 35% to 45% resin, from 22% to 28% sand, from 17% to 23% continuously wound glass filaments, from 5% to 15% axially extending glass fibers, and from 3% to 7% randomly disposed chopped glass fibers. A satisfactory construction for the structural wall portion of low pressure pipe comprises substantially 40% resin, 25% sand, 20% continuously wound glass filaments, 10% axially extending glass fibers, and 5% randomly disposed chopped glass fibers.

For an intermediate pressure range, pipes may have a structural wall portion 32b comprising from 35% to 45% resin, from 15% to 25% sand, from 12% to 18% chopped glass fibers, and from 22% to 28% continuously wound glass filaments. A satisfactory construction for the structural wall portion comprises substantially 40% resin, 20% sand, 15% chopped glass fibers and 25% continuously wound glass filaments.

Pipes for use with high internal pressures may have a structural wall portion 32b comprising from 28% to 45% resin, from 12% to 18% chopped glass fibers, and from 40% to 60% continuously wound glass filaments. A particular structure which has worked out very well comprises substantially 40% resin, 45% continuously wound glass filaments, and 15% chopped glass fibers. Another structure for somewhat higher pressures comprises substantially 30% resin, 55% continuously wound glass filaments, and 15% chopped glass fibers.

When axial reinforcement is desired, the structural wall portion for high pressure pipe may comprise from 30% to 45% resin, from 30% to 45% continuously wound glass filaments, from 3% to 15% chopped glass fibers, and from 5% to 25% axially extending glass fibers. A satisfactory construction for the structural wall portion comprises substantially 40% resin, 35% continuously wound glass filaments, 5% chopped glass fibers, and 20% axially extending glass fibers. Another excellent construction for the structural wall portion of high pressure pipe with axial reinforcement comprises substantially 40% resin 37% continuously wound glass filaments, 10% chopped glass fibers, and 13% axially extending glass fibers.

Various modifications may be made in the structure shown and described without departing from the spirit and scope of the invention as set forth in the appended claims.

We claim:

1. A pipe wall construction comprising a relatively thin, sand-free, resin-rich, glass fiber reinforced thermosetting resin protective inner liner portion, a relatively thick intermediate structural wall portion constituting the load-bearing portion of the pipe wall construction as designed and including by weight from 30% to 60% thermosetting resin, from 1% to 45% sand, from 3% to 25% randomly disposed chopped glass fibers, and from 1% to 60% circumferentially extending continuously wound glass filaments, the resin, sand, chopped glass fibers, and continuously wound glass filaments of the structural wall portion being distributed uniformly, whereby in a cross section of the pipe wall construction the structural wall portion appears to be a single homogeneous layer as distinct from plural layers of different compositions, and a relatively thin, resin-rich, glass fiber reinforced thermosetting resin protective outer wall portion, the glass fiber reinforcement of the relatively thin, resin-rich, protective inner liner and outer wall portions affording corrosion resistance by preventing surface cracking otherwise likely to occur if the inner liner and outer wall portions were entirely resin.

2. A pipe wall construction as claimed in claim 1 wherein the liner portion is from 0.02 inches to 0.15 inches thick.

3. A pipe wall construction as claimed in claim 1 wherein the liner portion consists of a glass fiber surface mat, randomly disposed chopped glass fibers, and resin.

4. A pipe wall construction as claimed in claim 3 wherein the liner portion is from 60% to 95% resin by weight and from 5% to 40% glass fiber reinforcement.

5. A pipe wall construction as claimed in claim 3 wherein the liner portion is from 70% to 80% resin by weight and from 20% to 30% glass fiber reinforcement.

6. A pipe wall construction as claimed in claim 1 wherein the liner portion consists of a glass fiber surface mat and resin.

7. A pipe wall construction as claimed in claim 6 wherein the liner portion is from 90% to 95% resin by weight and from 5% to 10% surface mat by weight.

8. A pipe wall construction as claimed in claim 1 wherein the liner portion consists of randomly disposed chopped glass fibers and resin.

9. A pipe wall construction as claimed in claim 8 wherein the liner portion is from 70% to 80% resin by weight and from 20% to 30% chopped glass fibers.

10. A pipe wall construction as claimed in claim 1 wherein the structural wall portion is from 0.10 inches to 3.0 inches thick.

11. A pipe wall construction as claimed in claim 1 wherein the structural wall portion includes by weight from 35% to 45% resin, from 30% to 45% sand, from 10% to 20% randomly disposed chopped glass fibers, and from 3% to 7% circumferentially extending continuously wound glass filaments.

12. A pipe wall construction as claimed in claim 1 wherein the structural wall portion includes by weight substantially 40% resin, 40% sand, 15% randomly disposed chopped glass fibers, and 5% circumferentially extending continuously wound glass filaments.

13. A pipe wall construction as claimed in claim 1 wherein the structural wall portion includes by weight from 35% to 45% resin, from 22% to 32% sand, from 12% to 18% randomly disposed chopped glass fibers, and from 13% to 23% circumferentially extending continuously wound glass filaments.

14. A pipe wall construction as claimed in claim 1 wherein the structural wall portion includes by weight substantially 40% resin, 25% sand, 15% randomly disposed chopped glass fibers, and 20% circumferentially extending continuously wound glass filaments.

15. A pipe wall construction as claimed in claim 1 wherein the structural wall portion includes by weight substantially 40% resin, 30% sand, 15% randomly disposed chopped glass fibers, and 15% circumferentially extending continuously wound glass filaments.

16. A pipe wall construction as claimed in claim 1 wherein the structural wall portion includes by weight from 35% to 45% resin, from 22% to 28% sand, from 3% to 7% randomly disposed chopped glass fibers, from 17% to 23% circumferentially extending continuously wound glass filaments, and from 5% to 15% axially extending glass fibers.

17. A pipe wall construction as claimed in claim 1 wherein the structural wall portion includes by weight substantially 40% resin, 25% sand, 5% randomly disposed chopped glass fibers, 20% circumferentially extending continuously wound glass filaments, and 10% axially extending glass fibers.

18. A pipe wall construction as claimed in claim 1 wherein the structural wall portion includes by weight from 35% to 45% resin, from 15% to 25% sand, from 12% to 18% randomly disposed chopped glass fibers, and from 22% to 28% circumferentially extending continuously wound glass filaments.

19. A pipe wall construction as claimed in claim 1 wherein the structural wall portion includes by weight substantially 40% resin, 20% sand, 15% randomly disposed chopped glass fibers, and 25% circumferentially extending continuously wound glass filaments.

20. A pipe wall construction as claimed in claim 1 wherein the outer wall portion is from 0.01 inches to 0.10 inches thick.

21. A pipe wall construction as claimed in claim 1 wherein the outer wall portion consists of randomly disposed chopped glass fibers and resin.

22. A pipe wall construction as claimed in claim 21 wherein the outer wall portion is from 70% to 80% resin by weight and from 20% to 30% chopped glass fibers.

23. A pipe wall construction as claimed in claim 1 wherein the outer wall portion consists of a glass fiber surface mat, randomly disposed chopped glass fibers, and resin.

24. A pipe wall construction as claimed in claim 23 wherein the outer wall portion is from 60% to 95% resin by weight and from 5% to 40% glass fiber reinforcement.

25. A pipe wall construction as claimed in claim 23 wherein the outer wall portion is from 70% to 80% resin by weight and from 20% to 30% glass fiber reinforcement.

26. A pipe wall construction as claimed in claim 1 wherein the outer wall portion consists of a glass fiber surface mat and resin.

27. A pipe wall construction as claimed in claim 26 wherein the outer wall portion is from 90% to 95% resin by weight and from 5% to 10% surface mat by weight.

28. A pipe wall construction comprising a relatively thin, sand-free, resin-rich, glass fiber reinforced thermosetting resin protective inner liner portion, a relatively thick intermediate structural wall portion constituting the load-bearing portion of the pipe wall construction as designed and including by weight from 28% to 60% thermosetting resin, from 3% to 25% randomly disposed chopped glass fibers, and from 1% to 60% circumferentially extending continuously wound glass filaments, the resin, chopped glass fibers, and continuously wound glass filaments of the structural wall portion being distributed uniformly, whereby in a cross section of the pipe wall construction the structural wall portion appears to be a single homogeneous layer as distinct from plural layers of different compositions, and a relatively thin, resin-rich, glass fiber reinforced thermosetting resin protective outer wall portion, the glass fiber reinforcement of the relatively thin, resin-rich, protective inner liner and outer wall portions affording corrosion resistance by preventing surface cracking otherwise likely to occur if the inner liner and outer wall portions were entirely resin.

29. A pipe wall construction as claimed in claim 28 wherein the liner portion is from 0.02 inches to 0.15 inches thick.

30. A pipe wall construction as claimed in claim 28 wherein the liner portion consists of a glass fiber surface mat, randomly disposed chopped glass fibers, and resin.

31. A pipe wall construction as claimed in claim 30 wherein the liner portion is from 60% to 95% resin by weight and from 5% to 40% glass fiber reinforcement.

32. A pipe wall construction as claimed in claim 30 wherein the liner portion is from 70% to 80% resin by weight and from 20% to 30% glass fiber reinforcement.

33. A pipe wall construction as claimed in claim 28 wherein the liner portion consists of a glass fiber surface mat and resin.

34. A pipe wall construction as claimed in claim 33 wherein the liner portion is from 90% to 95% resin by weight and from 5% to 10% surface mat by weight.

35. A pipe wall construction as claimed in claim 28 wherein the liner portion consists of randomly disposed chopped glass fibers and resin.

36. A pipe wall construction as claimed in claim 35 wherein the liner portion is from 70% to 80% resin by weight and from 20% to 30% chopped glass fibers.

37. A pipe wall construction as claimed in claim 28 wherein the structural wall portion is from 0.10 inches to 3.0 inches thick.

38. A pipe wall construction as claimed in claim 28 wherein the outer wall portion is from 0.01 inches to 0.10 inches thick.

39. A pipe wall construction as claimed in claim 28 wherein the outer wall portion consists of randomly disposed chopped glass fibers and resin.

40. A pipe wall construction as claimed in claim 39 wherein the outer wall portion is from 70% to 80% resin by weight and from 20% to 30% chopped glass fibers.

41. A pipe wall construction as claimed in claim 28 wherein the outer wall portion consists of a glass fiber surface mat, randomly disposed chopped glass fibers, and resin.

42. A pipe wall construction as claimed in claim 41 wherein the outer wall portion is from 60% to 95% resin by weight and from 5% to 40% glass fiber reinforcement.

43. A pipe wall construction as claimed in claim 41 wherein the outer wall portion is from 70% to 80% resin by weight and from 20% to 30% glass fiber reinforcement.

44. A pipe wall construction as claimed in claim 28 wherein the outer wall portion consists of a glass fiber surface mat and resin.

45. A pipe wall construction as claimed in claim 44 wherein the outer wall portion is from 90% to 95% resin by weight and from 5% to 10% surface mat by weight.

46. A pipe wall construction as claimed in claim 28 wherein the structural wall portion includes by weight from 28% to 45% resin, from 12% to 18% randomly disposed chopped glass fibers, and from 40% to 60% circumferentially extending continuously wound glass filaments.

47. A pipe wall construction as claimed in claim 28 wherein the structural wall portion includes by weight substantially 40% resin, 15% randomly disposed chopped glass fibers, and 45% circumferentially extending continuously wound glass filaments.

48. A pipe wall construction as claimed in claim 28 wherein the structural wall portion includes by weight substantially 30% resin, 15% randomly disposed chopped glass fibers, and 55% circumferentially extending continuously wound glass filaments.

49. A pipe wall construction as claimed in claim 28 wherein the structural wall portion includes by weight from 30% to 45% resin, from 3% to 15% randomly disposed chopped glass fibers, from 30% to 45% circumferentially extending continuously wound glass filaments, and from 5% to 25% axially extending glass fibers.

50. A pipe wall construction as claimed in claim 28 wherein the structural wall portion includes by weight substantially 40% resin, 5% randomly disposed chopped glass fibers, 35% circumferentially extending continuously wound glass filaments, and 20% axially extending glass fibers.

51. A pipe wall construction as claimed in claim 28 wherein the structural wall portion includes by weight substantially 40% resin, 10% randomly disposed chopped glass fibers, 37% circumferentially extending continuously wound glass filaments, and 13% axially extending glass fibers.

* * * * *